United States Patent [19]

Kaminski et al.

[11] Patent Number: 4,543,503

[45] Date of Patent: Sep. 24, 1985

[54] VENTILATED END TURNS FOR ROTOR WINDINGS OF A DYNAMOELECTRIC MACHINE

[75] Inventors: Christopher A. Kaminski, Schenectady; Edward K. Williams, Delanson, both of N.Y.

[73] Assignee: General Electric Company, Schenectady, N.Y.

[21] Appl. No.: 563,330

[22] Filed: Dec. 20, 1983

[51] Int. Cl.[4] .............................................. H02K 9/00
[52] U.S. Cl. ...................................... 310/59; 310/43; 310/60 R; 310/61; 310/64; 310/270
[58] Field of Search .................. 310/271, 270, 201, 65, 310/52, 53, 55, 214, 57, 58, 43, 45, 59, 60 R, 60 A, 61, 64

[56] References Cited

U.S. PATENT DOCUMENTS

| | | | |
|---|---|---|---|
| 2,653,255 | 9/1953 | Baudry | 310/55 |
| 2,833,944 | 5/1958 | Willyoung | 310/61 |
| 2,864,014 | 12/1958 | Schmitt | 310/61 |
| 2,986,664 | 5/1961 | Willyoung | 310/61 |
| 3,005,119 | 10/1961 | Schmitt | 310/61 |
| 3,225,231 | 12/1965 | Kudlacik | 310/64 |
| 4,311,931 | 1/1982 | Fujioka | 310/55 |
| 4,335,324 | 6/1982 | Fujioka | 310/59 |

FOREIGN PATENT DOCUMENTS

| | | | |
|---|---|---|---|
| 0579009 | 7/1959 | Canada | 310/55 |
| 0722293 | 11/1965 | Canada | 310/61 |
| 1029084 | 4/1958 | Fed. Rep. of Germany | 310/64 |
| 1072724 | 1/1960 | Fed. Rep. of Germany | 310/64 |
| 0619841 | 3/1961 | Italy | 310/61 |
| 0376996 | 6/1964 | Switzerland | 310/64 |

*Primary Examiner*—R. Skudy
*Attorney, Agent, or Firm*—John F. Ahern; Paul Checkovich

[57] ABSTRACT

A ventilation scheme for rotor windings in a dynamoelectric machine includes passages axially extending through the axial end turn conductors of the windings. Each axially extending conductor is an integral, single bar of metal having a groove thereon which defines the passages in cooperation with the turn insulation interposed between each conductor and the underlying and overlaying conductors. Circumferential end turn conductors are mechanically and electrically attached to the axial end turn conductors by reinforcing plates. Circumferential passages through the circumferential end turn conductors allow gas to flow between an end turn region and an isolated low pressure area. The centrifugal pumping action developed by the rotation of the rotor draws gas from the end turn region through the passages and to the periphery of the rotor body.

13 Claims, 10 Drawing Figures

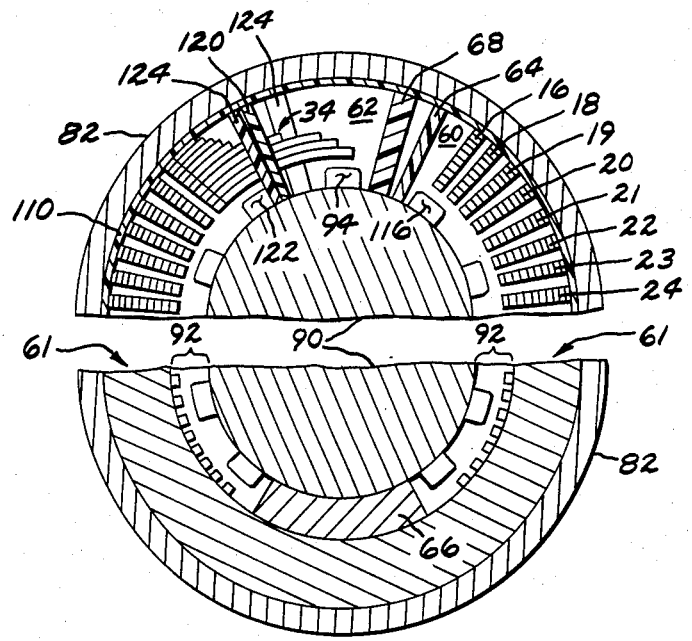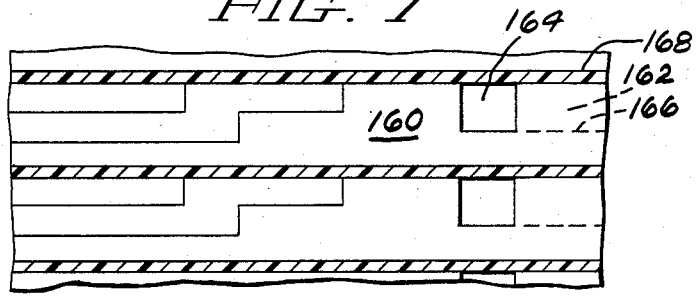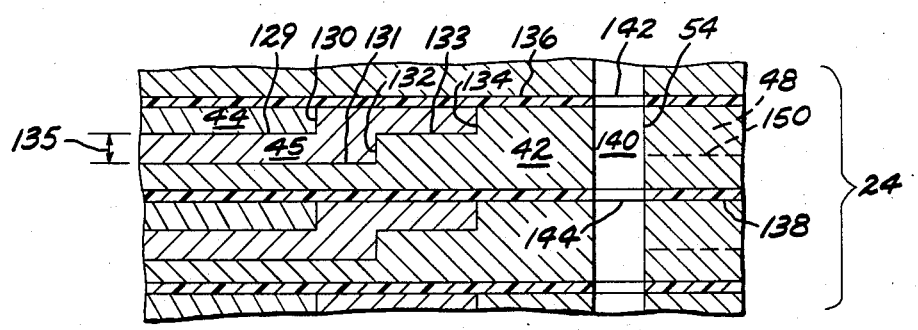

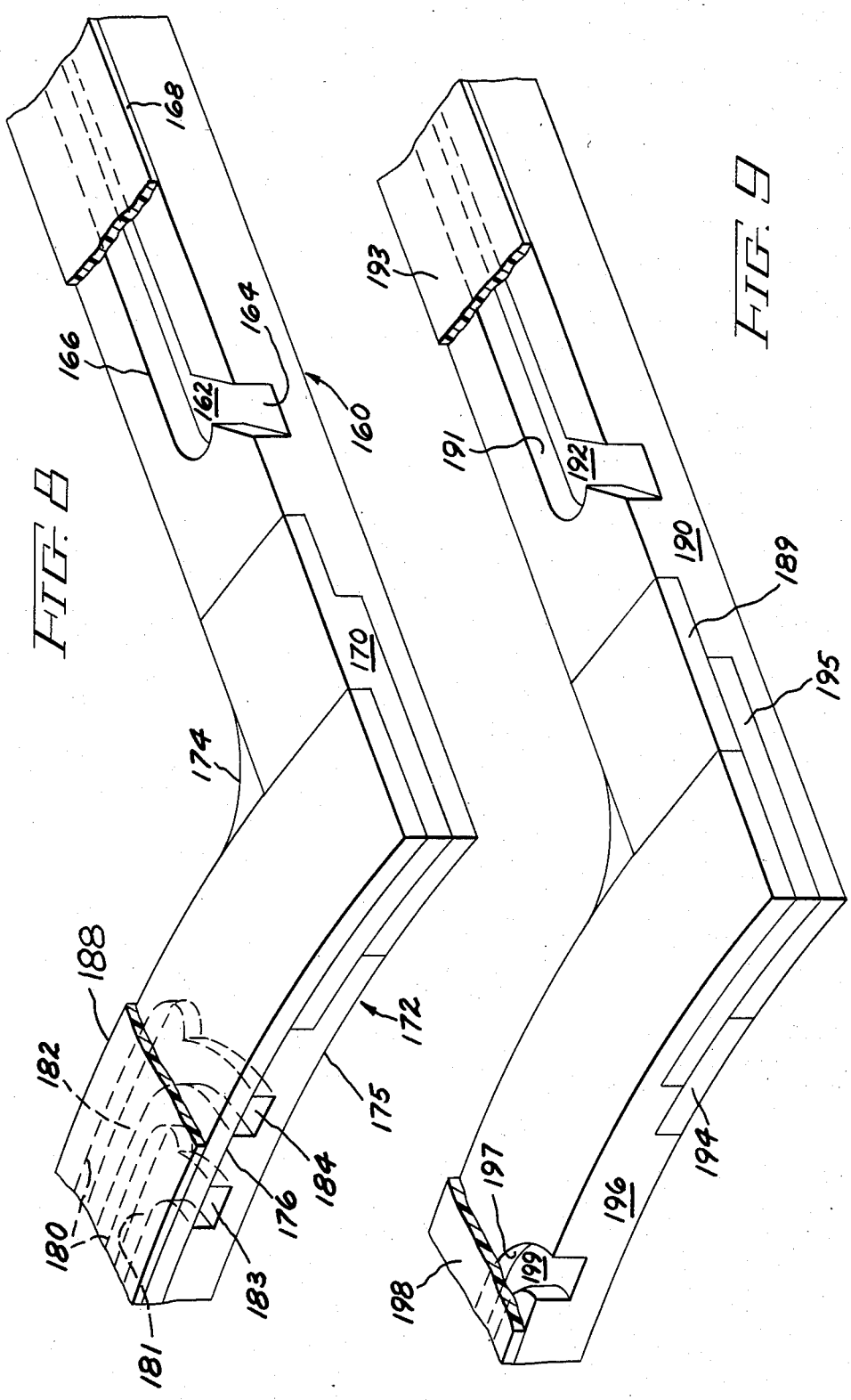

VENTILATED END TURNS FOR ROTOR WINDINGS OF A DYNAMOELECTRIC MACHINE

BACKGROUND OF THE INVENTION

This invention relates generally to the rotor windings of a dynamoelectric machine, and particularly, to means for ventilating the end turn windings.

The rotors, in large gas cooled dynamoelectric machines, have a central rotor body portion defining a plurality of axial winding slots within which are disposed a plurality of rotor windings. The slots are circumferentially spaced on the periphery of the rotor body on either side of a pole portion.

To generate the electromagnetic field for the dynamelectric machine, a number of conductors carry current in loops about each pole of the rotor. The conductors are radially stacked in groups with interposed layers of insulation between each conductor in a particular group. As is well recognized in the art, the intensity of the field is related to the level of voltage applied to the conductors which form the rotor winding and the amount of current flowing through the conductor. It is sometimes desirable to utilize higher voltages and proportionally lower currents for dynamoelectric machines. However, the higher voltages, and lower currents require that more turns or conductors be placed in the same winding slot.

This requirement for more turns per winding slot translates into a requirement that each conductor in the slot must be thinner if the rotor's size is constant. It is commonly recognized that the conductors utilized in the above-mentioned rotors are copper bars, although other highly-conductive metals such as aluminum and silver are sometimes utilized as conductors.

Another important consideration relates to the cooling of the windings in the rotor. It is well recognized in the art, that heat is generated in the conductor due to the currents flowing through the windings. To remedy this situation, the axially extending portions of the conductors disposed in the winding slots (hereinafter termed "slot-lying conductors"), are cooled by gas flowing through a plurality of gas cooling channels. Other means of cooling utilize substantially diagonal channels in each group of conductors in communication with intake flues at the pole face, and with the periphery of the rotor body. A more complete description of a cooling means appears in U.S. Pat. No. 2,986,664, issued to Willyoung et al. which describes a diagonal flow, direct cooled rotor and that description is incorporated herein by reference thereto. It is recognized that if the slot-lying conductors must be cooled due to $I^2R$ heating problems, the end turn conductors must also be cooled.

The end turn conductors include the axial extensions of the slot-lying conductors and a plurality of circumferential end turn conductor members which complete the current carrying loops of the rotor winding. The axial end turn conductors are the axial extensions of the slot-lying conductors extending beyond the rotor body. Although a distinction is made herein between the slot-lying conductors and the axial end turn conductors, both of these conductors are in fact one continuous axially extending conductor. Each circumferential conductor is mechanically and electrically connected to a corresponding axial end turn conductor, hence both conductors are stacked, either circumferentially or radially, with interposed layers of turn insulation therebetween. A retaining ring is affixed to the rotor body and circumferentially surrounds and holds the end turn conductors in place against circumferential force, such as centrifugal force developed during rotation of the rotor. A centering ring is affixed to the retaining ring and is axially spaced from the rotor body to substanially enclose the end turn conductors in cooperation with the retaining ring and the rotor body. Spindles extend from either axial end of the rotor body. In this manner, an end turn region is defined by the rotor body, the radially inner portion of the retaining ring, the surface of the spindle and the inboard surface of the centering ring.

Cooling of the end turn conductors has been accomplished by prior art devices in many ways. One well known mechanism utilizes two bars of copper for each conductor. The bars have longitudinal grooves facing each other and the bars are stacked upon each other to form a passage through each conductor. This two bar configuration allows gas flowing through the passage formed by the two facing grooves to cool the conductor.

It is well recognized in the art that cool gas, proximate to the centering ring and spindle, is drawn into the end turn region through an annular space defined by the radially inward portion of the retaining ring and the radially aligned surface portion of the spindle due at least in part to the centrifugal pumping action. This centrifugal pumping action is caused by the rotation of the rotor and the radial differential between the gas intake and the gas exhaust, i.e., the annular space and the periphery of the rotor body. As is well recognized in the art, the rotor body, and sometimes the slot-lying conductors, form gas discharge flues which open to the periphery of the rotor body.

One prior art device, described in U.S. Pat. No. 3,005,119, issued to Schmitt et al., shows a series of supports to hold the end turn conductors, and a series of baffles sectioning off the end turn region to create a plurality of high and low pressure sections in that region. A series of passages in each axial end turn conductor and circumferential end turn conductor provide means for cooling gas to flow throuh those conductors. The device disclosed in Schmitt et al. utilizes a two bar conductor scheme with each bar hav a groove or hollow extruded section which faces a similar groove or extruded section of the other bar. Also, the apparatus disclosed in Schmitt et al. is complicated to manufacture because of the number of baffles separating the high and low pressure sections. The above-noted patent issued to Schmitt et al. is incorporated herein by reference thereto.

Another prior art device disclosed in U.S. Pat. No. 3,225,231, issued to Kudlacik, utilizes a set of baffles defining high and low pressure sections in the end turn region. Also, the Kudlacik device includes a plurality of radially cutouts through the centering ring which act as radial passages to discharge the gas from the low pressure areas to the periphery of the retaining ring. Again, the conductors are twin bars having longitudinally extending internal gas cooling passages which open onto the high and low pressure sections. The patent issued to Kudlacik is incorporated herein by reference thereto.

Although it is known to construct rotor windings utilizing single bars for the axially extending conductors, problems have arisen regarding end turn ventilation of the portions of those single, integral bars axially extending beyond the rotor body. Cooling the slot-lying portion of those integral bar conductors can be accomplished by known mechanisms. Cooling the end turns of those single bar conductors is difficult because the physical connection between the axial end turn conductors and the circumferential end turn conductors must be strong.

Typically, the corner includes a reinforcing plate with a gusset to strengthen the connection. The gusset is on the inboard portion of the plate. The gusset is preferably spaced from the underlying and overlaying stacked conductors, hence the gusset is recessed from the conductor's top and bottom surfaces. This spacing is preferable because the interposed layer of turn insulation is not easily extended to cover the gusset.

Generally, prior art devices utilizing a twin bar conductor system had six to twelve turns per winding slot, or six to twelve conductors per slot. To increase the number of turns, it is desirable to have single bar conductors, however the prior art devices for cooling the end turn conductors do not address single bar axial conductors. One of ordinary skill in the art will recognize that relatively thin twin bar conductors, those conductors being less than one-half of an inch, are not easily manufactured with facing grooves forming cooling passages. Similarly, a single, integral conductor bar due to the difficulty in manufacturing those passages is not easily manufactured with a completely internal cooling passage therein. A person skilled in the art will recognize an end turn ventilation scheme utilizing those relatively thin integral bars would be highly desirable because the number of turns in the field winding could be increased simply by making the bars thinner given a rotor of a certain radial dimension. Another complication of the single bar conductor system involves connecting the axial end turn conductors to the circumferential end turn conductors.

OBJECTS OF THE INVENTION

It is an object of this invention to provide an end turn ventilation system for axially extending single bar conductors as rotor windings in a dynamoelectric machine.

It is an additional object of this invention to provide for an end turn ventilation system which does not feed cooling gas through corners connecting the axially extending end turn conductors to the circumferential conductors.

It is a further object of this invention to provide for corners which do not require special turn insulation between conductors.

It is a further object of this invention to provide for an end turn ventilation system which provides cooling means for relatively thinner single bar axial conductors thereby allowing the number of turns per slot to be increased without increasing the size of the rotor.

BRIEF DESCRIPTION OF THE DRAWINGS

The subject matter which is regarded as the invention is particularly pointed out and distinctly claimed in the concluding portion of this specification. The invention, however, together which further objects and advantages thereof, may best be understood by reference to the following description taken in connection with the accompanying drawings in which:

FIG. 4 is a broken, cross sectional radial view of the spindle, end turn windings, centering ring, and retaining ring, wherein the top portion of FIG. 4 is generally from the perspective of section lines 4—4' and wherein the bottom portion of FIG. 4 is from the perspective of section lines 4"—4"', all of FIG. 1;

FIG. 5 is a side view of one corner of the radially stacked conductors viewed from the ? perspective of section line 5—5" in FIG. 1;

FIG. 7 is a side view of a corner of the stacked axial end turn conductors as viewed from the perspective of section line 7—7' of FIG. 6;

FIG. 8 illustrates a perspective, cutaway view of one corner between the axial end turn conductors and the circumferential conductors;

FIG. 9 is a perspective, cutaway portion of a corner showing the connection between the axial end turn conductors and the circumferential conductors of an alternate embodiment of this invention.

SUMMARY OF THE INVENTION

Figure 1:
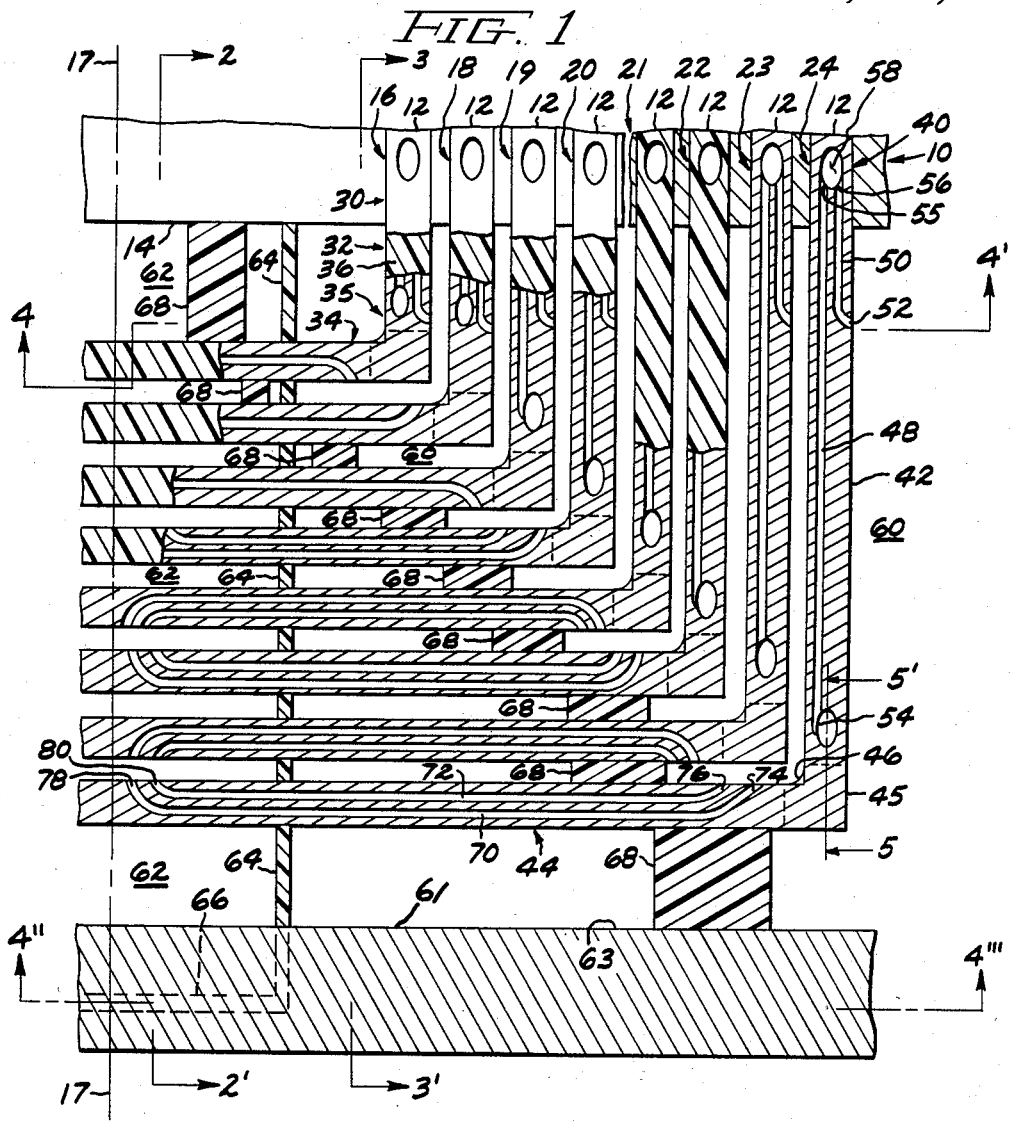
FIG. 1 is a developed plan view of a quarter portion of the end turn conductors for one pole of a rotor.

A rotor winding, including an end turn ventilation means, has a plurality of axially extending conductors disposed in winding slots in a rotor body which extend axially into the end turn region of the rotor. Each axial conductor is a single integral bar of metal with groups thereof being radially stacked with interposed layers of insulation therebetween. Each axial conductor is connected to a circumferential conductor to form current carrying loops about a pole portion of the rotor body. The circumferential conductors are circumferentially stacked with interposed layers of insulation between each conductor. A retaining ring surrounds the axial and circumferential conductors and a centering ring axially encloses an end turn region about the end turn conductors along with the retaining ring, the adjacent spindle, and the rotor body. An annular space is defined between the radially inward portion of the centering ring and the aligned portion of the spindle of the rotor and permits gaseous flow into the end turn region due, at least in part, to the centrifugal pumping action developed by the rotation of the rotor. A blocking means defines a low pressure area within the end turn region. The low pressure area arcuately spans a predetermined portion of the pole face of the rotor body and includes a portion of the circumferential conductors as well as axially confining the circumferential conductors. The low pressure area is in communication with a gas discharge flue extending from the pole face through the rotor body to the periphery of the rotor body. The centrifugal pumping action lowers the pressure in the low pressure area and causes a pressure differential between that area and the end turn region.

Each integral axially extending conductor includes a slot-lying conductor portion, disposed in the slot of the rotor body, and an axial end turn conductor portion, axially extending beyond the rotor body. Each axial end turn conductor includes a coolant carrying passageway defined by a groove in the integral conductor bar and by the interposed insulation. Each passageway has an inlet port in communication with the end turn region. Each slot-lying conductor includes a longitudinal gas cooling channel and the stacked slot-lying conductors form a plurality of discharge holes in communication with the periphery of the rotor body. The passageway through each axially extending conductor is in communication with the longitudinal channels and the discharge holes. The centrifugal pumping action causes gas to flow through the axial end turn conductors and out of the periphery of the rotor body.

Each individual circumferential conductor includes at least two cooling passages with corresponding inlets and outlets. Each passage begins at opposing sides of the pole face and extends lengthwise through the circumferential conductor between the end turn region and the pressure region. The cooling passages are adapted to convey gas due to the pressure differential between the end turn region and the low pressure region which is caused in part by the centrifugal pumping action developed during rotation of the rotor.

DETAILED DESCRIPTION OF THE INVENTION

This invention relates generally to rotors and rotor windings in a gas cooled dynamoelectric machine, and specifically to an end turn ventilation means for those rotor windings. FIG. 1 is a cutaway quarter of a developed plan view of a rotor winding. Rotor forging 10 defines a plurality of axially extending slots 12. Only portions of slot 12, proximate to a pole face 14 are illustrated in FIG. 1. As is well recognized in the art, slots 12 are circumferentially spaced on the periphery of rotor body or rotor 10 on either side of a pole portion. Windings are disposed in slot 12 and are electrically connected to form current carrying loops about a pole portion of rotor 10.

As illustrated in FIG. 1, a radially innermost coil 16 is closest to a pole centerline 17. Coils 18, 19, 20, 21, 22, 23 and 24 are illustrated as being sequentially further from pole centerline 17 in FIG. 1. Coil 16, for purposes herein, includes a group of radially stacked windings each having a slot lying portion 30, an axial end turn portion 32, and the coil also includes a circumferential end turn portion 34. As will be illustrated hereinafter, coil 16 includes a plurality of stacked conductors with layers of turn insulation interposed between each conductor. A conductor 35 has an axially extending end turn portion 32 and a circumferential end turn portion 34. Insulation 36 is illustrated as cutaway on FIG. 1.

Coils 18 through 24 similarly include slot-lying portions, axially extending end turn portions and circumferential end turn portions similar to coil 16. The interposed layer of insulation, hereinafter termed "turn insulation" has been cutaway from outer coils 23 & 24. Coil 24 includes a slot-lying conductor 40, and an axial end turn conductor 42, which is an integral extension of conductor 40, and a circumferential end turn conductor 44 which is electrically and mechanically connected to end turn conductor 42. A reinforcing plate 45 mechanically and electrically connects conductor 42 to conductor 44. Reinforcing plate 45 includes an inboard gusset portion 46.

It is to be understood that conductor 40 and 42 is a single integral bar of metal, normally copper. Since conductor 40, 42 is a single integral bar, a greater number of conductors are radially stacked in slot 12 as compared with the prior art, twin bar conductors, thereby increasing the number of turns in coil 24.

An end turn ventilation means includes passageways in the axial end turn portions of coils 16, 18–24, and at least two cooling passages in each circumferential conductor portion. Conductor 42 includes axially extending coolant carrying passageways 48 and 50 defined by grooves in the integral bar. It is easily recognized that turn insulation, not shown in relation to coil 24, but shown as cutaway on coils 16, 18–20, defines passageways 48 and 50. Passageway 50 has an inlet port 52 directly open to the adjacent region. Passageway 48 has an inlet port 54. Inlet port 54 is open to a substantially radial orifice through conductor 42. Similar radial orifices extend through each conductor, stacked as coil 24, and extend through each interposed layer of turn insulation. Those orifices are aligned thereby forming a radial vent which is not illustrated in FIG. 1 but is illustrated and discussed hereinafter. The radial vent is open to the adjacent region at a radially inner portion of coil 24. Coils 16, 18–23 have similar radial vents therethrough. In this manner, the inlet ports are in communication with the adjacent region via the radial vent.

Passageways 48, 50 communicate with substantially longitudinal cooling channels which are in communication with a radial hole 58 extending through conductor 40. Outlet ports 55, 56 of the channels are open to hole 58. Hole 58 defines, at least in part a discharge hole through the stacked slot-lying conductors, one of which is conductor 40. The discharge hole extends through the interposed layers of turn insulation. The holes through the underlying and overlaying conductor bars, as well as, the holes through the interposed turn insulation are substantially radially aligned. The discharge hole which includes hole 58, communicates with the periphery of the rotor body hence, passageways 48, 50 and their respective channels communicate through outlet ports 55, 56 to hole 58 and the discharge hole to the periphery of the rotor body. As illustrated in FIG. 1, coils 16, 18–24, all define discharge holes. It is to be understood that the term "substantially radial" is meant to include strictly radial chimneys and also chimneys which have some longitudinal aspects. The patent issued to Willyoung No. 2,986,664 referenced previously discloses diagonal chimneys and those diagonal chimneys are meant to be covered by the term "substantially radial" chimneys. Likewise, the term "substantially longitudinal" is meant to encompass generally longitudinal or axially extending passages, but the term also includes passageways which have some radial component to their extent.

Pole face 14 is part of the axial end face of the rotor body. Pole face 14 defines the inboard portion of an end turn region generally designated 60 in FIG. 1. The axial extent of end turn region 60 is defined by an inboard surface 63 of a centering ring 61 which is affixed to a retaining ring, not illustrated in FIG. 1 but described and illustrated hereinafter. Generally, end turn region 60 encompasses both the axial end turn conductors and the circumferential end turn conductors. Defined within end turn region 60 is a low pressure area 62 which is isolated from the balance of end turn region 60 by a blocking means, which includes a partition 64. Partition 64 axially extends from face 14 to inboard surface 63 of centering ring 61 and hence axially spans the circumferential conductors. Partition 64 sealingly engages the circumferential conductors, one of which circumferential conductor portion 34 of coil 16 and another which is conductor bar 44 of coil 24. Partition 64 also sealingly engages all the conductors with which it intersects and surface 63. The blocking means also includes radially disposed end plate 66. Since FIG. 1 illustrates only one quarter section of coils 16, 18–24, a second partition, which is not shown in FIG. 1, blocks off low pressure area 62 from the end turn region. In this manner, low pressure area 62 arcuately spans a predetermined portion of pole face 14 including an arcuate portion of each circumferential end turn conductor.

To maintain the axial spacing of the coils, blocks 68 are disposed in an orderly manner throughout the end turn region and the low pressure area. The placement and a further description of blocks 68 can be found in U.S. Pat. No. 2,883,944, of Willyoung, which is incorporated herein by reference thereto. The Willyoung 2,893,944 patent describes several blocking schemes for the end turn conductors hence, the illustrated placement and disposition of blocks 68 is not meant to be limiting herein.

Circumferential, conductor bar 44 of coil 24 includes lengthwise passages 70 and 72 which extend from one side of pole face 14, proximate end turn region 60, to low pressure area 62 proximate pole centerline 17. Although conductor 44 is illustrated having passages 70, 72, it is not absolutely necessary that the conductor have two passages as illustrated in FIG. 1. In other words, conductor 44 could only have one cooling passage such as illustrated for conductors 16, 18 and 19, which extend from end turn region 60 into low pressure region 62. Passages 70, 72 have inlets 74, 76, respectively, which communicate with end turn region 60. Passages 70, 72 have outlets 78, 80, respectively which communicate with low pressure area 62. The opposing portion of conductor bar 44, the portion not illustrated in FIG. 1 but being a mirror image of FIG. 1 from the perspective of pole centerline 17, preferably has two cooling passages extending from the farthest opposing portion of opposed end region 60 extending into a portion of low pressure area 62 immediately adjacent pole centerline 17. As a minimum, each circumferential conductor must have at least two cooling passages respectively extending lengthwise between opposing portions of end turn region 60 on either side of the pole face into low pressure area 62.

Figure 2:
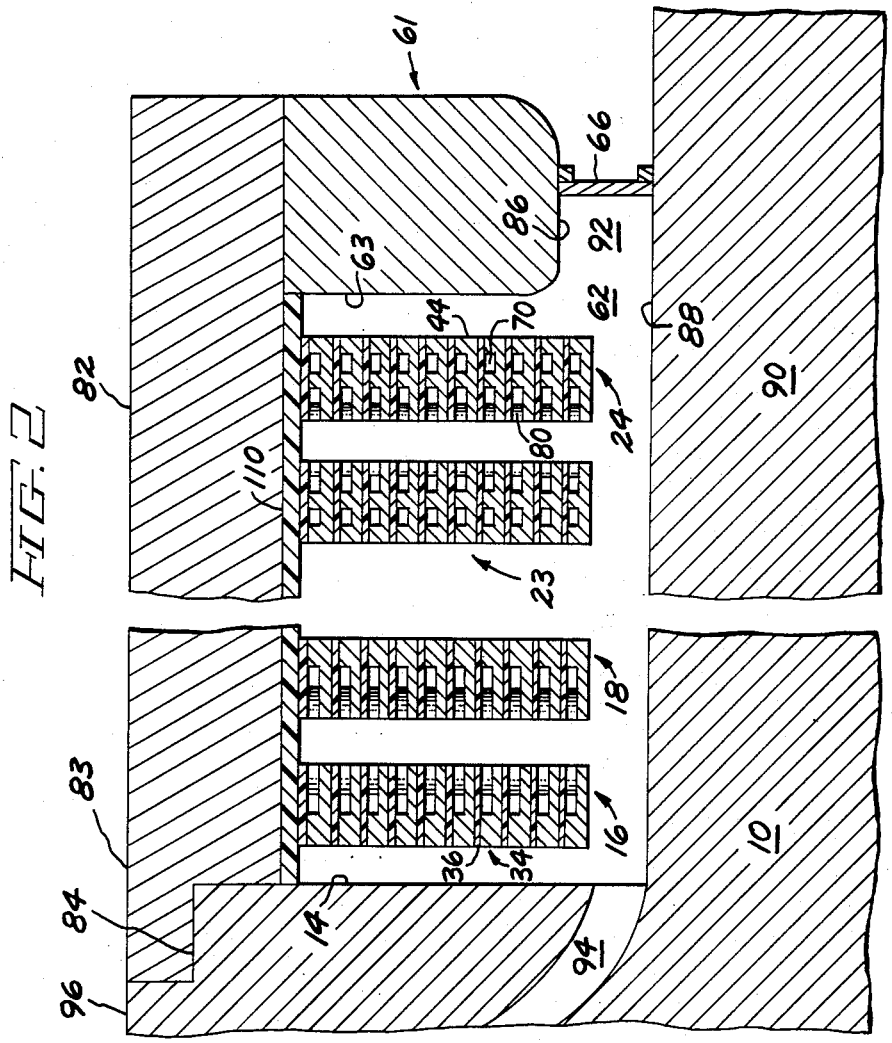
FIG. 2 is a longitudinal, broken, cross sectional view from the general perspective of section lines 2—2' of FIG. 1.

FIG. 2 illustrates a longitudinal, broken, cross sectional view from the perspective of section line 2—2' of FIG. 1. Similar items numerically identified in FIG. 1 are carried forward in FIG. 2. Particularly, FIG. 2 illustrates low pressure area 62 axially defined by face 14 and inboard surface 63 of centering ring 61. Retaining ring 82 is affixed to rotor body 10 by lip 83, normally by a shrink fit at interface 84. Retaining ring 82 holds both the axial and circumferential end turn conductors in place against circumferential force developed during rotation of the rotor. FIG. 2 clearly illustrates centering ring 61 axially confining and substantially enclosing the end turn region which s the end turn conductors. Centering ring 61 defines an annular space between its radially inward portion 86 and spindle surface 88 of spindle 90. Annular space 92 is blocked off by end plate 66 to form low pressure region 62. A gas discharge flue 94 is in communication with low pressure area 62 and extends from pole face 14 through rotor body 10 to a periphery 96 of rotor body 10. The left-hand extension of discharge flue 94 is not illustrated in FIG. 2, however, it is well known in the art how to construct discharge flue 94 extending to periphery 96 of rotor body 10.

Also clearly illustrated in FIG. 2 is the circumferential end turn portions of coils 16, 18, 23 and 24. The conductors, one of which is circumferential conductor 34 of coil 16, are circumferentially stacked in groups which comprise the coil. As is well recognized in the art, the greater number of conductors per group or per stack increases the number of turns in the rotor winding, thereby, allowing an increase in voltage to that winding and a decrease in current required to produce the same electromagnetic field for the dynamoelectric machine. Retaining ring 82 has a layer of insulation 110 along its radially inner surface.

Figure 3:
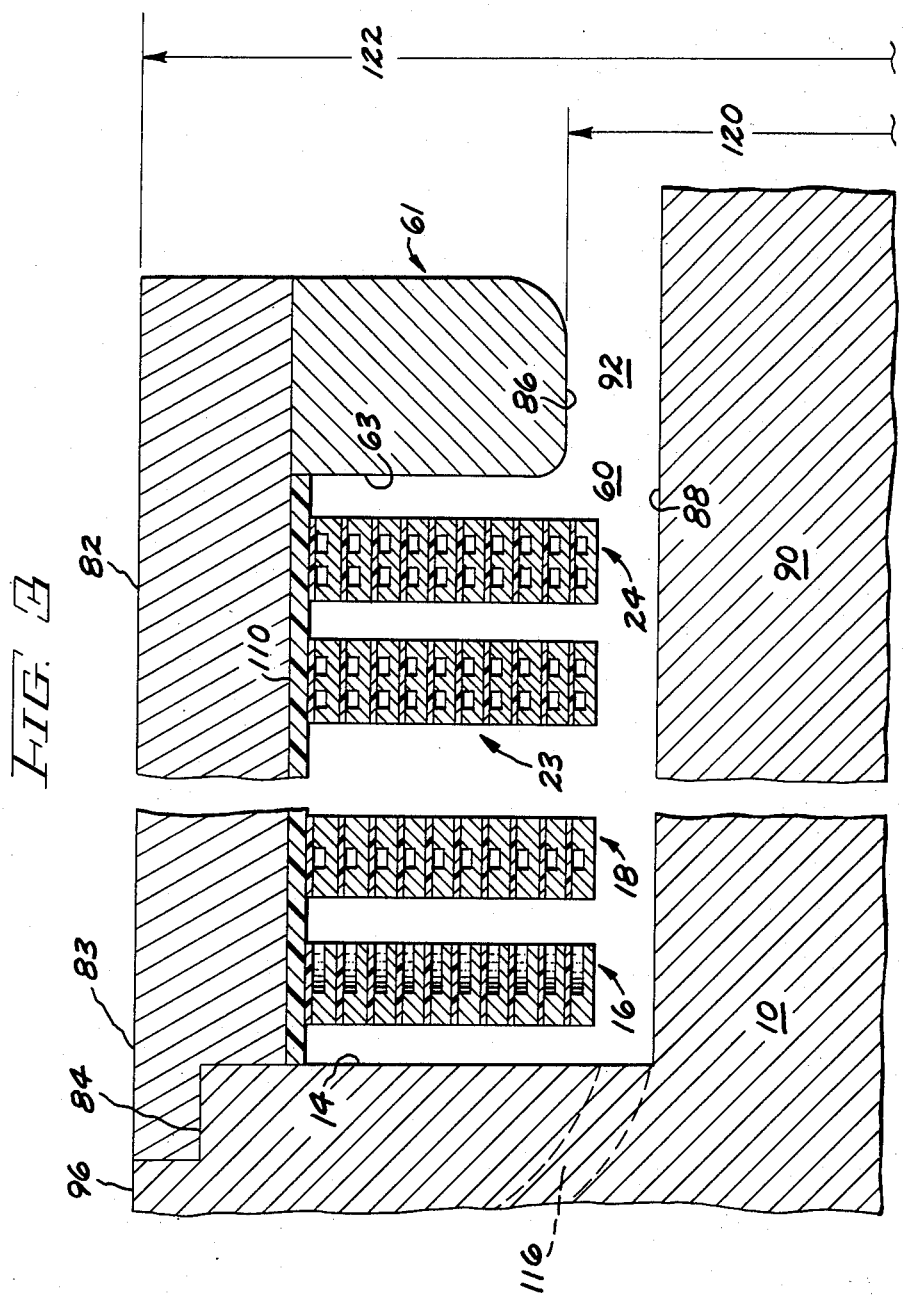
FIG. 3 is a longitudinal, broken, cross sectional view from the general perspective of section lines 3—3' in FIG. 1.

FIG. 3 is a longitudinal, broken, cross sectional view from the perspective of section line 3—3' of FIG. 1. FIG. 3 illustrates substantially the same components as FIG. 2, however, the perspective of FIG. 3 looks into end turn region 60 from a line of sight beyond low pressure area 62. In contrast, FIG. 2 is viewed from a perspective inside low pressure region 62. Hence, annular space 92, between inner surface 86 and surface 88 of spindle 90, is open to the ambient environment. Annular space 92 permits gaseous flow into end turn region 60. Intake flue 116 is illustrated extending from pole face 14 through rotor body 10. It is well known in the art that intake flue 116 carries cooling gas through rotor body 10 to the diagonal cooling channels defined by the slot-lying conductors. The centrifugal pumping action of the rotor is generally related to radial distance 120 versus radial distance 122, both measured from the rotor's axis of rotation, i.e., the radial extent of surface 86 versus the radial extent of periphery 96, respectively. During normal operation, significant centrifugal forces are developed in a radially outward direction. The centrifugal forces may be on the order of $10^4$ times the force of gravity. Hence, annular space 92 permits cooler gas from the ambient environment to be drawn into end turn region 60. The cooler gas in end turn region 60 moves radially outward due to the centrifugal pumping action and is eventually heated by the end turn conductors. Gas from the end turn region flows into inlet ports proximate to that region, such as inlet ports 52, 54 of conductor 42 (see FIG. 1) and inlets 74, 76 of conductor 44. Cooling gas flows through passageways 48, 50 and passages 70, 72 thereby cooling axial end turn conductor 42 and circumferential conductor 44 respectively. The gas axially flowing through conductor 42 is discharged through the discharge hole defined in part by hole 58 via the respective channel to periphery 96 of rotor body 10. Gas flowing lengthwise through conductor 44 and passing through passages 70, 72 is discharged into low pressure area 62 through ports 78, 80 proximate that area. As illustrated in FIG. 2, gas exiting port 80 into low pressure area 62 is drawn radially inward due in part to the centrifugal pumping action which lowers the pressure in that area and the gas eventually drawn through gas discharge flue 94 to periphery 96 of rotor body 10.

FIG. 4 is an axial cross sectional view generally from the perspective of section line 4—4' and 4"—4'" of FIG. 1 including a broken 360° view. The rotor of the illustrated embodiment is a two pole dynamoelectric machine wherein one set of rotor windings is circumferentially spaced on either side of a pole portion having its pole center roughly at 0° and a second set of rotor windings disposed on either side of a second pole portion having its pole center at 180° as viewed from FIG. 4. It is well known in the art that the rotor may include a plurality of poles and hence the illustrated embodiment is not meant to be limiting.

The bottom half of FIG. 4 is viewed from the general perspective of section line 4″—4‴ which is a view midway through centering ring 61. Clearly illustrated in the bottom half FIG. 4 is end plate 66 blocking off an arcuate portion of annular space 92. The top half of FIG. 4 shows low pressure region 62 isolated from end turn region 60 by partition 64 and partition 120 which define an arcuate span across a predetermined portion of the pole face. Circumferential end turn conductors, one of which is conductor 34, arcuately span the pole portion and connect the axial end turn conductors of coil 16 to one another to form a current carrying loop about that pole portion. Discharge flue 94 is shown open to low pressure area 62. Intake flue 116, as well as intake flue 122, is shown open to end turn region 60 and those flues communicate cooling gas to the diagonal cooling channels in the slot-lying conductors as is well known in the art. The top of FIG. 4 also illustrates and blocks 124, being oppositely disposed corresponding to blocks 68 illustrated in that Figure and FIG. 1.

FIG. 5 is a broken away side view of a portion of the radial stack of conductors as viewed from the perspective of section line 5—5′ of FIG. 1. FIG. 5 illustrates reinforcing plate 45 mechanically and electrically connecting circumferential conductor 44 to axially end turn conductor 42. Conductor 42 is normally brazed to plate 45 along step surfaces 129, 130 and conductor 42 is brazed to the plate along step surfaces 131, 132, 133 and 134. A gusset 46, illustrated in FIG. 1, is coplanar to the lower stepped plane 135. Hence, an overlaying interposed turn insulation 136, lying atop conductors 42, 44 and plate 45, and an underlying turn insulation 138, lying below those conductors and that plate, are spacially separated from gusset 46. This spacial separation substantially eliminates the need for special turn insulation in the corner region of the conductors which would be required to electrically separate each conductor from the others in the stack.

Axial end turn conductor 42 has a radial Orifice 140 extending through it and open to inlet port 54, thereby allowing communication with passageway 48. Insulation 136 and 138 have radial orifices 142, 144, respectively, substantially radially aligned with orifice 140. The underlying conductor bars and overlaying conductor bars adjacent to conductor 42 also have radial orifices. The radial orifices are aligned to form a radial vent which extends from the radially inner conductor of coil 24 to the radially outer conductor.

As stated earlier, conductor 42 is a single integral bar, normally copper. Conductor 42 has a cooling passageway therein formed by a groove 150 illustrated in FIG. 5 on its radially outer surface. Insulation 136 provides a top wall for passageway 48. In operation, cooling gas enters the radially inner conductor of a coil, flows radially outward through the radial vent and to each passageway through each conductor, substantially longitudinally through the axial passageway and is discharged out of the holes as illustrated in FIG. 1.

Due to the relative thinness of conductor 42, which is on the order of one-half an inch or less, a completely internal longitudinal cooling passageway cannot be manufactured. Hence, passageway 48 can only be a machined or extruded groove in a bar of copper. Reinforcing plate 45 is not thick enough to have a cooling passage in it and still maintain good electrical and mechanical connection between conductor 42 and conductor 44, hence the cooling passages and passageways through the circumferential and axial end turn conductors, respectively, do not extend into plate 45.

Figure 6:
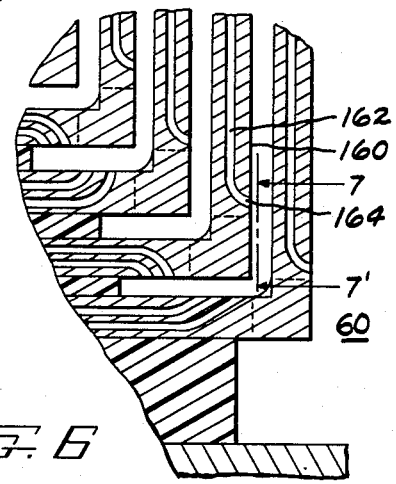
FIG. 6 is an alternate embodiment of this invention showing a cutaway, developed plan view of side ports in the axial end turn conductors.

As is well known in the art, radial vents may be replaced by side ports in each of the conductor bars. FIG. 6 is a small cutaway view of a developed plan illustrating side ports in the axial end turn conductors rather than the preferred radial vent scheme for the single conductor bar system. In this embodiment, conductor bar 160 defines in part axial cooling passageway 162 along with the overlaying interposed turn insulation. Passageway 162 has an inlet port 164 open to end turn region 60.

A side view of the embodiment illustrated in FIG. 6 is shown in FIG. 7 from the perspective of section line 7—7′ of FIG. 6. FIG. 7 clearly illustrates side port 164 being open to the end turn region and in communication with passageway 162 which is defined by groove 166 and overlaying turn insulation 168.

A perspective of this embodiment is illustrated in FIG. 8. Reinforcing plate 170 mechanically and electrically connects conductor 160 to circumferential conductor 172. A continuously curved inner vertex or gusset corner 174 of plate 170 is illustrated in FIG. 8. Gusset corner 174 is spaced respectively below and above the top and the bottom surface of plate 170, respectively. FIG. 8 also illustrates conductor 172 including two integral bars 175 and 176 and overlying insulation 188. Bar 175 and bar 176 are laid atop each other an together form conductor 172. In one embodiment, bar 175 is relatively thicker than bar 176. Bar 175 has a pair of grooves 180 which define cooling passages 181 and 182. Bar 176, lying atop bar 175, defines the top wall of cooling passages 181, 182. Side ports 183 and 184 communicate with passages 181, 182 respectively and with the end turn region which is proximate the corner.

FIG. 9 is a perspective of the corner between an axial end turn conductor and a circumferential conductor in another embodiment of this invention wherein each of the axial and circumferential end turn conductors are a single bar of metal, commonly copper joined by a plate 195. Hence, integral bar 190 has groove 191 machined or extruded into the top of it to form passageway 192 in cooperation with turn insulation 193. Reinforcing plate 195 mechanically and electrically connects conductor 190 with circumferential end turn conductor 196. Plate 195 is brazed to an upper and a lower insert 189 and 194 respectively. Groove 197 is machined or extruded into conductor 196 and cooperates with turn insulation 198 to define cooling passage 199. Cooling passageway 192 in conductor 190 and passage 199 in conductor 196 are open to the end turn region thereby allowing cool gas to flow through both end turn conductors. Although the grooves forming the passageways through the axial end turn conductors and the passage through the circumferential conductors are illustrated only on the radially or circumferentially top side of the bars, the grooves could be on the bottom side.

Figure 10:
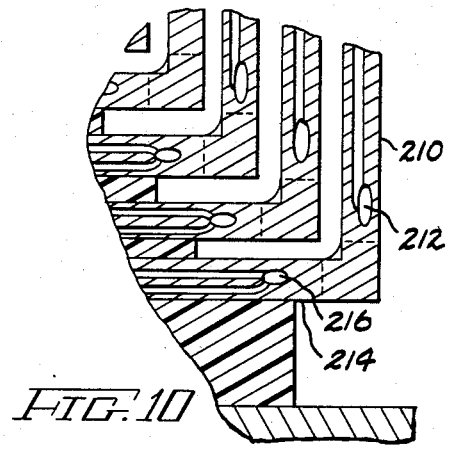
FIG. 10 is a cutaway portion of a developed plan view of another embodiment of this present invention.

FIG. 10 is a broken away, cutout, cross sectional developed plan of a different embodiment of the present invention. The distinctive features of FIG. 10 illustrae conductor 210 having a radial vent 212 and conductor bar 214 having radial chimney 216. Radial chimney 6 is formed by a series of radial apertures through conductor bar 214 and the underlying and overlaying conductor bars as well as radial apertures through the interposed turn insulation. Those radial apertures are substantially radially aligned to allow communication of gas from the radially inner conductor through chimney 216 to the various passages in the circumferential end turn conductors.

It is well known in the art to provide for various cooling systems for the slot-lying portions of the axially extending conductors. Hence, detailed descriptions of such slot-lying cooling systems have not been described herein. It is also recognized by those of ordinary skill in the art that single integral bar conductors have been utilized as coils. However, an end turn ventilation system as described herein is unique from the standpoint of defining a low pressure area within an end turn region, defining a prescribed number of passageways through the axial end turn conductors and passages through the circumferential end turn conductors, as well as, the preservation of the reinforcing plate which electrically and mechanically connects the axial end turn conductors to the circumferential end turn conductors. Hence, the detailed description relating to whether radial vent holes provide communication of cooling gas to each of the conductors rather than individual side ports in each of the conductors is not meant to be limiting even though, the preferred embodiment utilizes radial vents through single bar conductors to minimize chafing of the turn insulation. However, it is important to recognize the integrity of the reinforcing plate with respect to the spacial placement of the inlet ports for the passageways and inlets for the passages away from the plate. As a person of ordinary skill in the art will recognize that the radial vent through the axial end turn conductors need not communicate with each passageway. The group of conductors could have several radial vents with each vent communicating with a limited number of inlet ports and corresponding passageways. Likewise, sideports or inlet ports directly open to the end turn region can be intermixed with the radial vent scheme.

It will be well recognized by those of ordinary skill in the art that the blocking means defined herein by partitions 64 and 120 and end plate 66 are not meant to be limiting. In other words, end plate 66 could be axially inboard of centering ring 62, and in such a system, end plate 66 would extend from the radially inner surface of retaining ring 82 to surface 88 of spindle 90. Similarly, low pressure area 62 would be radially foreshortened by providing a coaxial arcuate floor radially spaced from surface 88 of spindle 90. In such a system, low pressure area 62 would be defined by a pair of partitions arcuately spanning a portion of the pole face, an end plate axially defining the low pressure area and an arcuate floor radially spaced from, yet coaxial with surface 88 of spindle 90. In such a system, gas discharge flue 94 would be open from the pole face to low pressure area 62. However, annular space 92 would be in communication with substantially all of the axial end face of the rotor body 10. This system may have advantages relating to cooling the slot-lying portions of the conductors. Such a system would be obvious to those of ordinary skill in the art after understanding the present invention described and claimed herein.

The claims appended hereto are meant to cover the present invention, modifications, and other modifications readily apparent to those of ordinary skill in the art.

We claim:

1. In combination with a rotor for a gas cooled dynamoelectric machine, said rotor inlcuding a rotor body defining at least a pair of axial winding slots, one of the at least a pair of winding slots respectively circumferentially disposed at the periphery of the rotor body on respective sides of a pole portion of the rotor body and the rotor body further defining at least one gas discharge flue extending from a pole face of the rotor body to the periphery of the rotor body, the pole face disposed on an axial end of the rotor body, said rotor further including a spindle coupled to the axial end of the rotor body, said spindle for rotatably mounting said rotor, a rotor winding cooling system comprising:

a plurality of axially extending electrical conductors disposed in the winding slots, at least a portion of the axial conductors extending beyond said rotor body to form an axial end turn conductor, at least one of said plurality of axial conductors disposed on each side, respectively, of said pole face, each axial conductor including a first bar of metal, said first bar having a first substantially longitudinal groove for forming a passageway for receiving a first portion of gas, said passageway defined in part by insulation to be interposed between axial conductors within said winding slot for respectively electrically insulating each axial conductor within said winding slot from other axial conductors within said winding slot, respectively, said passageway including first port means for introducing gas into the passageway and second port means for withdrawing gas from the passageway a plurality of circumferential end turn electrical conductors for respectively electrically connecting the respective at least one of said plurality of axial conductors on one side of the pole face with the respective at least one of said plurality of axial conductors on the other side of the pole face, respectively, for forming a respective current carrying loop, each circumferential end turn conductor including a second bar of metal having a second substantially longitudinal groove for forming a passage for receiving a second portion of gas, said passage defined in part by a member coupled to the second bar, said plurality of circumferential end turn conductors arcuately spanning said pole portion and stacked with electrical insulation interposed between adjacent circumferential end turn conductors, respectively, said passage including third port means for introducing gas into the passage and fourth port means for withdrawing gas from the passage;

a retaining ring affixed to said rotor body and circumferentially surrounding said axial and circumferential end turn conductors for maintaining said axial and circumferential end turn conductors in fixed spatial relationship against centrifugal and circumferential forces;

a centering ring affixed to said retaining ring and axially spaced from said rotor body to substantially enclose an end turn region about said axial and circumferential end turn conductors, said end turn region defined by the axial end of said rotor body, the radial inner surface of said retaining ring, the radial outer surface of the spindle and the axial surface of said centering ring opposing the axial end of said rotor body, said centering ring further defining an annular space between the radially inward portion of said centering ring and the radially outer portion of the spindle, said annular space for introducing flow of the first and second portion of gas into said end turn region; and blocking means disposed within said end turn region for preventing gas flow communication between a portion of said end turn region and the balance of said end turn region for forming a low pressure area in said portion of said end turn region, said low pressure area arcuately spanning a predetermined portion of said pole face and a predetermined arcuate portion of said plurality of circumferential end turn conductors, said low pressure area further axially spanning said circumferential end turn conductors, and said low pressure area in gas flow communication with said gas discharge flue, wherein centrifugal pumping action during rotation of said rotor encourages gas to flow through said discharge flue to the periphery of said rotor, thereby reducing the pressure within the low pressure area of said end turn region with respect to the pressure in the balance of said end turn region; wherein the first and third port means are in gas flow communication with the balance of said end turn region, the second port means is in gas flow communication with the periphery of said rotor and the fourth port means is in gas flow communication with the low pressure area of said end turn region.

2. A cooling system as in claim 1 wherein at least one of said axial end turn conductor includes a first radial orifice in gas flow communication with the respective first port means of the respective axial conductor and respective interposed insulation having a second radial orifice, said first and second orifices substantially aligned with other orifices through the overlaying and underlying axial end turn conductors and respective insulation disposed in the same winding slot to form a substantially radial vent extending from the radially inner axial end turn conductor to the radially outer axial end turn conductor, wherein said vent enables gas to flow from the balance of said end turn region, through said radial vent and said passageway to said periphery of said rotor body.

3. A cooling system as in claim 2 wherein each first orifice of each axial end turn conductor is in gas flow communication with the respective first port means of the respective axial conductor.

4. A cooling system as in claim 1 further including reinforcing means electrically and mechanically connecting at least one circumferential end turn conductor to a corresponding axial end turn conductor, said reinforcing means including an inboard gusset spaced below and above the top and bottom surfaces of said reinforcing means, respectively.

5. A cooling system as in claim 4 wherein said rotor includes a plurality of pole portions and a respective plurality of pole faces; each pole face having an associated gas discharge flue respectively terminating thereon and defined in part by said rotor body; and a plurality of low pressure areas defined in part by a respective plurality of blocking means;

each of said respective plurality of blocking means including a pair of partitions extending axially between the respective pole face and the inboard surface of said centering ring, said partitions sealingly engaging the circumferential end turn conductors which intersect said partitions, and sealingly engaging the radially inner surface of said retaining ring and the radially outer surface of the spindle, said partitions thereby establishing the arcuate span of the respective ones of the plurality of low pressures areas, each of said respective plurality of blocking means further including a radially disposed end plate bridging said annular space between said centering ring and the radially outer surface of the spindle, and said end plate sealingly engaging the outboard ends of both partitions to substantially isolate the respective low pressure area from the balance of said end turn region and the ambient environment.

6. A cooling system as in claims 1, 2, 3, 4, or 5 wherein said member includes a single bar of metal.

7. A cooling system as in 1, 2, 3, 4, or 5 wherein said member includes a single integral bar of metal having a first flat surface coextensive with the second substantially longitudinal groove for defining in part said passage and a second flat surface for receiving the insulation.

8. A cooling system as in claim 1, 2, 3, 4, or 5 wherein each circumferential end turn conductor having a radial orifice open to its respective inlet and aligned with similar orifices through said interposed insulation to form a radial venthole, said radial venthole allowing gas to flow from the balance of said end turn region to said low pressure area of said end turn region; and each circumferential end turn conductor having a first radial aperture in gas flow communication with the respective fourth port means and each first radial aperture aligned with second radial apertures through said interposed insulation to form a radial chimney, said radial chimney for permitting communication of gas from each respective passage to said low pressure area of said end turn region.

9. A cooling system as in claim 4 wherein said passageway and passage terminate before extending into said reinforcing means.

10. An electrically conductive coil for a gas cooled dynamoelectric machine, said machine including a rotor defining at least two axially extending slots respectively disposed on respective sides of a pole portion of the rotor, said slots for receiving at least a portion of said coil, said coil comprising:

a pair of slot lying segments, a respective one of said pair for disposition within the respective slots, at least one of said slot lying segments including a single electrically conductive bar, said bar having a first longitudinal groove for forming a passageway, the passageway defined in part by the surface of electrical insulation disposable on said bar;

reinforcing means respectively coupled to said at least one of said pair of said slot lying segments at one end of the bars; bars, said reinforcing means having an upper and lower surface and an end turn segment coupled to said reinforcing means so as to form a conrer formed in part by said reinforcing means, said end turn segment including a first elongated electrically conductive member, said first elongated electrically conductive member having a second longitudinal groove, and said end turn segment further including a second elongated electrically conductive member coupled to said first member for sealingly engaging said first member to form a passage wherein the passage includes the second groove and further, wherein the passageway and the passage respectively include a gas input and a gas output, respectively.

11. The coil as in claim 10 wherein said reinforcing means includes a gusset disposed at the corner, said gusset for providing structural rigidity between said end turn segment and said at least one of said pair of slot lying segments, wherein said gusset is further disposed intermediate the upper and lower surface of said reinforcing means.

12. The coil as in claim 11 wherein said at least one of said pair of slot lying segments, said end turn segment and said reinforcing means form a substantially squared-off contour at the exterior of the corner, thereby facilitating placement of the insulation on said at least one of said pair of slot lying segments, said end turn segment and said reinforcing means.

13. The coil as in claim 10 wherein said reinforcing means inhibits gas flow communication between said passageway and said passage.

* * * * *